(12) United States Patent
Baker

(10) Patent No.: US 7,167,329 B2
(45) Date of Patent: Jan. 23, 2007

(54) COMPOUND PHASE ENCODING FOR PRINTED SERVO PATTERNS

(75) Inventor: Bill Richard Baker, 3824 Vineyard Dr., Redwood City, CA (US) 94061

(73) Assignee: Bill Richard Baker, Redwood City, CA (US)

( * ) Notice: Subject to any disclaimer, the term of this patent is extended or adjusted under 35 U.S.C. 154(b) by 56 days.

(21) Appl. No.: 10/519,440

(22) PCT Filed: Dec. 31, 2003

(86) PCT No.: PCT/US03/41733

§ 371 (c)(1),
(2), (4) Date: Dec. 29, 2004

(87) PCT Pub. No.: WO2004/075176

PCT Pub. Date: Sep. 2, 2004

(65) Prior Publication Data

US 2005/0259341 A1 Nov. 24, 2005

Related U.S. Application Data

(60) Provisional application No. 60/447,442, filed on Feb. 14, 2003.

(51) Int. Cl.
*G11B 5/02* (2006.01)

(52) U.S. Cl. .......................................... 360/55; 360/53
(58) Field of Classification Search ................. 360/55, 360/75, 69, 51, 31, 77.04, 77.01, 78.02, 77.08, 360/77, 53, 77.02, 78.04; 369/13.28; 711/4
See application file for complete search history.

(56) References Cited

U.S. PATENT DOCUMENTS 3,686,649 A 8/1972 Behr
3,869,711 A 3/1975 Bernard et al.

(Continued)

FOREIGN PATENT DOCUMENTS

GB 2361576 A 10/2001

OTHER PUBLICATIONS

Ishida, et al., "Printed media technology for an effective and inexpensive servo track writing of HDDs", IEEE Trans. Magn., vol. 37, No. 4, Jul. 2001, pp. 1875-1877.

(Continued)

*Primary Examiner*—Fred F. Tzeng

(57) ABSTRACT

A type of servo pattern suitable for tracking systems in magnetic recording devices such as floppy disks or linear tape or hard disks or in other machines. The pattern comprises several phase-encoded elements that provide an absolute transverse position coordinate from local data. Computations can be made with channel chips commonly used in magnetic recording disk drives.

18 Claims, 5 Drawing Sheets

U.S. PATENT DOCUMENTS

| | | | | |
|---|---|---|---|---|
| 4,587,579 | A | * | 5/1986 | Cocke et al. ............... 360/75 |
| 4,819,153 | A | * | 4/1989 | Graham et al. ............... 360/69 |
| 4,882,671 | A | * | 11/1989 | Graham et al. ............... 711/4 |
| 5,034,827 | A | * | 7/1991 | Fukatsu et al. ............... 386/77 |
| 5,084,791 | A | * | 1/1992 | Thanos et al. ............ 360/77.04 |
| 5,309,299 | A | * | 5/1994 | Crossland et al. ....... 360/77.01 |
| 5,333,140 | A | | 7/1994 | Moraru et al. |
| 5,485,322 | A | * | 1/1996 | Chainer et al. ............... 360/51 |
| 5,570,247 | A | | 10/1996 | Brown et al. |
| 5,576,906 | A | * | 11/1996 | Fisher et al. ............ 360/77.08 |
| 5,581,420 | A | * | 12/1996 | Chainer et al. ............... 360/75 |
| 5,615,058 | A | * | 3/1997 | Chainer et al. ............... 360/51 |
| 5,661,760 | A | | 8/1997 | Patapoutian et al. |
| 5,784,296 | A | | 7/1998 | Baker et al. |
| 5,793,554 | A | * | 8/1998 | Chainer et al. ............... 360/75 |
| 5,875,064 | A | * | 2/1999 | Chainer et al. ............... 360/75 |
| 5,907,447 | A | * | 5/1999 | Yarmchuk et al. ............ 360/75 |
| 6,215,606 | B1 | * | 4/2001 | Chainer et al. ............... 360/31 |
| 6,304,407 | B1 | | 10/2001 | Baker et al. |
| 6,344,942 | B1 | * | 2/2002 | Yarmchuk ............... 360/75 |
| 6,469,848 | B1 | | 10/2002 | Hamada et al. |
| 6,469,859 | B1 | * | 10/2002 | Chainer et al. ............... 360/75 |
| 6,476,989 | B1 | * | 11/2002 | Chainer et al. ............... 360/31 |
| 6,580,581 | B1 | * | 6/2003 | Bui et al. ............... 360/78.02 |
| 6,603,627 | B1 | * | 8/2003 | Chainer et al. ............... 360/75 |
| 6,654,196 | B1 | * | 11/2003 | Yarmchuk ............... 360/75 |
| 6,704,156 | B1 | | 3/2004 | Baker et al. |
| 2002/0101670 | A1 | | 8/2002 | Ishida et al. |
| 2003/0095477 | A1 | * | 5/2003 | Horimai et al. .......... 369/13.28 |
| 2004/0085669 | A1 | * | 5/2004 | Cisewski et al. ............. 360/75 |
| 2004/0090693 | A1 | * | 5/2004 | Zhang et al. ............... 360/48 |

OTHER PUBLICATIONS

Ishida, et al., "Demodulation of servo tracking signals printed with a lithographically patterned master disk", IEEE Trans. Magn., vol. 37, No. 4, Jul. 2001, pp. 1412-1415.

Saito, et al., "Magnetic printing technique for longitudinal thin film media with high coercivity of 6000 Oe", J. Appl. Phys., vol. 91, No. 10, May 2002, pp. 8688-8690.

Sugita, et al., "A novel magnetic contact duplication technique for servowriting on magnetic disks", IEEE Trans. Magn., vol. 36, No. 5, Sep. 2000, pp. 2285-2287.

Tsang, et al., "Disk-noise induced peak jitters in high density recording", IEEE Trans. Magn., vol. 29, No. 6, Nov. 1993, pp. 3975-3977.

Van Herk, "Analytical expressions for side fringing response and crosstalk with finite head and track widths", IEEE Trans. Magn., vol. 13, No. 6, Nov. 1977, pp. 1764-1766.

Wang, "Photo thermal patterning on magnetic media", J. Appl. Phys., vol. 91, No. 10, May 2002, pp. 8685-8687.

Baker, "Tradeoffs for magnetic printing of servo patterns", J. Appl. Phys., vol 91, No. 10, May 2002, pp. 8691-8693.

Baker, "Direct print servo patterns for disk drives", MMM2004, paper EE-02, presented Nov. 10, 2004, to be published in J. Appl. Phys., May 2005.

U.S. Appl. No. 10/060,914, filed Jan. 29, 2002, Baker.

* cited by examiner

```
j 0    4    8    12   16   20   24   28   32   36   40   44   48   52   56   60   64
k 000000000000000011111111111111112222222222222222333333333333333 0
m 000011112222333300001111222233330000111122223333000011112222333 0
n 012301230123012301230123012301230123012301230123012301230123012 30
```

COMPOUND PHASE ENCODING FOR PRINTED SERVO PATTERNS

CROSS-REFERENCE TO RELATED APPLICATIONS

This application claims priority from U.S. Provisional Patent Application No. 60/447,442 filed Feb. 14, 2003, the entire disclosure of which is incorporated herein by reference, and International Application No. PCT/US 03/41733 filed Dec. 31, 2003.

FEDERALLY SPONSORED RESEARCH

Not Applicable

SEQUENCE LISTING OR PROGRAM

Not Applicable

BACKGROUND OF THE INVENTION

1. Field of the Invention

This invention relates to printing or rapidly transferring fixed servo reference data to surfaces such as those of magnetic storage media and, more particularly, to printing servo data with compound phase patterns that provide absolute position information, that are well suited to commercial data channel chips, and that require relatively little space on the recording surface.

2. Description of the Prior Art

Modern magnetic recording systems have servo information or position markers written in an interleaved fashion on the same surface on which data are recorded. To simplify the system the same head is used to read the user data and the servo information. Various special formats are used for the servo information to enable using measurements and subsequent signal processing to determine the position of the read head relative to the center of the desired data track. A head movement mechanism and servo control system keep the read head close enough to the data track center to assure reliable reading and writing of user data.

Early hard disk systems used a special machine, a servo track writer (STW), e.g. U.S. Pat. No. 5,333,140, to record the servo information on the disk surface. The STW includes a clamping system to hold the hard disk drive (HDD) in a fixed reference position and an external motor with a laser or optical encoder to accurately move a reference pin that extended into the HDD. The actuator or head positioning mechanism of the HDD is biased against the pin so the write head of the HDD can be placed at any desired radius by moving the external motor according to its encoder system. The STW also includes a clock head that is temporarily placed on a surface of the disk by means of a special aperture in the HDD case. Circuitry of the STW writes a clock signal or timing reference by applying a pattern of write current to the clock head. The clock head reads the timing reference signal as the HDD write head is moved to any desired radius. Since the timing reference is fixed relative to the disk it is possible to write servo patterns of a desired form as function of radius and angle on the disk. Related STW are used for removable media such as the ZIP floppy diskette system manufactured by Iomega Corporation.

The STW must turn the disk through at least one revolution to write the servo information, and another fraction of a revolution is required to move the head to the next radius. Many servo patterns use the edges of special bursts or sub elements in the determination of the position from the read back signal, so it is necessary to write the servo bursts at radial displacements of a fraction of the data track width. Therefore it is usually required to write two or more servo tracks for each data track. Since HDDs now have about one hundred thousand or more data tracks, it may require tens of minutes to write the servo pattern.

Because the enclosure of the HDD is required to have openings for the clock head and for the reference pin it is necessary to use the STW in a special clean room to avoid contamination of the head-media interface. It is expensive and difficult to maintain the complex STW in such a clean environment.

A new approach was offered by a "printing" method (Ishida, T., et al., "Printed Media Technology for an Effective and Inexpensive Servo Track Writing of HDDs", IEEE Trans. Magn., p 1875, 2001 and Sugita, R., et al., "A Novel Magnetic Contact Duplication Technique for Servo-Writing on Magnetic Disks", IEEE Trans. Magn. p 2285, 2001). In that method the desired servo pattern is replicated in a "master disk" consisting of a silicon substrate about one millimeter thick with strips of highly permeable cobalt about one half micron thick embedded in the silicon. The face of the master containing the cobalt elements is placed in contact with a D.C. erased slave disk. Then a permanent magnet producing an oppositely directed field is brought close to the back surface of the master and is rotated one revolution relative to the master-slave pair. The cobalt elements shield portions of the slave disk leaving them in the original D.C. state, but gaps in the cobalt pattern allow the field to penetrate. The field is concentrated at the gaps and the increased fringing components reverse the magnetization of the adjacent portions of the slave disk. This rapid transfer of the pattern to the entire surface of the slave disk, or "printing", is done as the last step at the end of a conventional disk manufacturing line.

Important feature sizes, typically line widths and the thickness of cobalt elements, have been steadily decreasing, but the transition density of printing currently lags that of conventional write heads. Direct printing of a conventional edge of burst servo pattern resulted in poor performance at contemporary data densities, (Ishida, et al., "Demodulation of servo tracking signals printed with a lithographically patterned master disk", *IEEE Trans. Magn.*, Vol. 37, No. 4, July, 2001, pp 1412–1415).

The conventional Gray codes would provide the absolute radial position, but they are not well suited to the printing process and result in fuzzy transitions at track edges. Unfortunately those codes occupy a large part of the surface, they are not well adapted to the architecture of commercial channel chips, and they require larger variations of widths of lines and spaces. The large variations of feature sizes exacerbate noise sources of the printing process. Proper choice of geometry including width and thickness of the cobalt elements and width of the gaps is necessary to assure magnetic switching of the slave medium next to the gaps of the master without saturating the cobalt film to produce "secondary gaps" and consequent writing of spurious pulses or noise (Saito, A., et al., "Magnetic printing technique for longitudinal thin film media with high coercivity of 6000 Oe", J. Appl. Phys., V 91, p 8688, 2002 and Baker, "Tradeoffs for magnetic printing of servo patterns", J. Appl. Phys., p 8691, 2002).

Therefore it was proposed in U.S. Pat. No. 6,304,407 to use the printed pattern as a reference system for self-servowriting (SSW). Because the printing method involves several processes such as optical diffraction, diffusion in the photo resist, and shadowing during sputtering of the cobalt, it is difficult to produce square corners or small radii of curvature at the ends of the cobalt lines. Therefore phase methods are used as in U.S. Pat. No. 3,686,649 for the position information, and the phase is measured by discrete Fourier transforms (DFT) in the manner of U.S. Pat. No. 5,784,296. In this method the ends of the bars in the inclined phase elements are excluded from the sample window, and pulses are measured at the long, clean edges of magnetic transitions.

After assembly of the HDD it is removed from the clean room and placed on a self-test rack where it begins its self-servowriting directed by the embedded firmware. Well known self-test methods measure possible pattern eccentricity and any minor errors of the position information for each servo block printed on the disk. Then corrections are applied for subsequent writing of a final servo pattern. The relatively low additional cost of printing one surface of a disk eliminates the need for an expensive STW and the clean room in which to operate it.

Mitsubishi Corporation using well-known magneto-optic (MO) techniques subsequently developed an alternate printing method. The same pattern described above is first replicated as a chromium on glass reticle or mask. Such masks are commonly created by photolithography. Opaque features are left as a thin chromium film on a transparent glass substrate. In this case too the slave disk is initially D.C. erased, and the printing magnet applies a field in the opposite direction. The applied field is a bit lower than the coercivity of the slave so its magnetization is preserved until a laser is flashed through the mask. The brief laser pulse heats areas under gaps of the pattern. The surface temperature of the recording film rises quickly decreasing the local coercivity and allowing the selected regions to switch magnetization directions.

This contact magneto-optic method also has limitations due to diffraction and to the difficulty of maintaining the small space between reticle and slave disk and due to reflections between the two. Using an antireflective coating on the reticle is difficult because the energy density of the laser irradiation damages the coating. Some of these problems are ameliorated by a projection printing demonstration (Wang, L., et al., "Photo thermal patterning on magnetic media", *J. Appl. Phys.*, V 91, p 8685, 2002).

As is well known in the disk drive industry the number of servo wedges or position bearing segments of the disk must increase as the track density increase. Drives now have a few hundred wedges and the trend is toward higher densities. The patterns are made by various processes such as fine scale lithography, which is also used in the manufacture of semiconductors and read-write heads for disk drives.

The SSW process described above utilized early printed disks when the critical feature sizes or printable line and space widths were greater than one micron. There was no absolute position information, but it was adequate to slowly move the head in small steps along the radial extent of the HDD to write each of the final servo tracks. The relatively large printed reference patterns are simply overwritten after the final pattern has been completed. It is also well known that fields at the edges of conventional write heads are poorly controlled, (Van Herk, "Analytical expressions for side fringing response and crosstalk with finite head and track widths", *IEEE Trans. Magn.*, Vol. 13, No. 6, November, 1977, pp 1764–1766 and Tsang, et al., "Disk-noise induced peak jitters in high density recording", *IEEE Trans. Magn.*, Vol. 29, No. 6, November, 1993, pp 3975–3977.) Therefore the STW and the SSW method both introduce noise at edges of bursts of conventional final servo patterns. That noise becomes a greater problem at extremely high track densities.

BRIEF SUMMARY OF THE INVENTION

One object of the present invention is to provide convenient absolute position information from a printed pattern so the cross track position of a read sensor of a magnetic recording system or other track oriented machine can be verified from only the local data.

Another object of this invention is to improve magnetic printing by reducing variations in feature size and to better match the pattern to the channel chip capabilities.

Another objective is to reduce the area required for the printed pattern so that it can be used directly as the final servo pattern without rewriting in a SSW mode.

DETAILED DESCRIPTION

The invention comprises two or more phase-encoded subsystems combined in a novel manner that provides an absolute position coordinate. The resulting pattern is well suited to available methods for printing servo patterns on magnetic recording media such as disks or linear tapes. The servo pattern can be easily read and decoded using commercial R/W (Read Write) or channels chips. This method can be used as reference for SSW (Self Servo Writing), and it requires much less surface area, so it can also be used as a final servo pattern.

Figure 1:
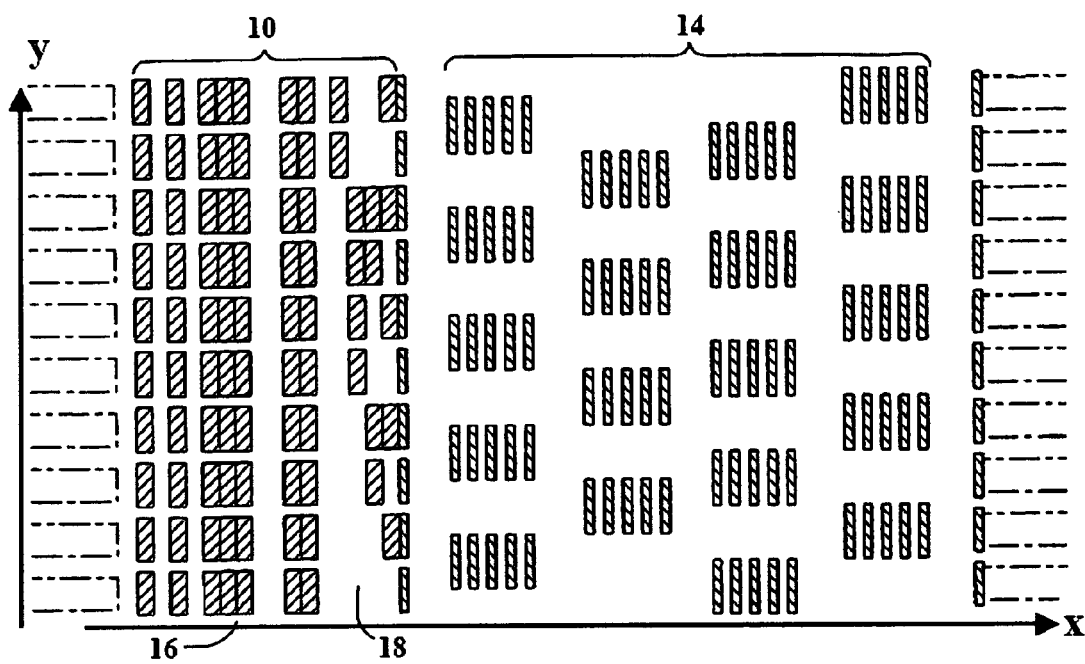
FIG. 1 is a diagram of a printed pattern of the prior art.

A schematic diagram in logical coordinates of FIG. 1 shows the magnetization distribution of printed patterns of the prior art. The abscissa or horizontal coordinate x is a down-track coordinate proportional to the time at which the read head encounters an element of the pattern. The ordinate, y, is a cross-track coordinate which changes as the head moves to a new track. The white background of the diagram corresponds to a "background" state of magnetization directed generally in the longitudinal direction of the tracks, either toward the right or toward the left (positive or negative x direction). The crosshatched pattern elements are regions where the magnetization has been reversed by the printing process.

The head and read channel produce a pulse as the head crosses a transition between the two states of magnetization. The sign of the pulse when the head leaves the background state is opposite that created at the return to the background. The absolute sign of the pulse at exit from the background is not critical to this invention, and most modern read channels can be configured to work with any consistent background state.

For a linear tape system with a linear actuator that moves the read head straight across the tracks, FIG. 1 resembles the magnetization distribution in physical coordinates on the tape.

For a disk drive with a linear actuator the servo pattern of FIG. 1 would map onto a wedge shaped region in physical coordinates so that vertical lines of FIG. 1 would diverge for increasing radius. For a disk with rotary actuator the constant time lines of the servo wedge would also be arcuate as well as diverging for larger radius.

The servo block of the schematic diagram of FIG. 1 comprises elements 10 that are centered relative to the data tracks. Those track centered data include elements for clock synchronizing, certain special flags such as a SAM (Servo Address Mark), an Index and other markers and Gray code bits, 18, for coarse position information. Conventional edge of burst fine position elements 14 are offset from the track centerlines. The dashed lines suggest boundaries of the user data tracks. Generally the number of lines and spaces in the timing segment 10 would be greater, but this diagram shows the concepts in a greatly simplified form.

Demonstrations of demodulation using this prior art, (ibid. Ishida, were made at relatively low track density. The magnetic printing from a permeable film pattern does not work well for Gray codes, 18, where some small regions should be reversed in the middle of the surrounding region of the background magnetization state. During printing an external field is applied in order to switch the regions under the openings of the pattern. However, the magnetic flux tends to stay in the film in large areas such as 18. Flux flows around smaller openings in the film leaving corresponding portions of the slave surface unaffected.

Another problem is that large film areas, required in the usual Gray codes, may become saturated and lose their shielding characteristic. That allows flux to penetrate the film and create unwanted pulses or noise. At large gaps in the film, 16, the fringing field is smaller, and the magnetization may not be completely reversed.

Figure 2:
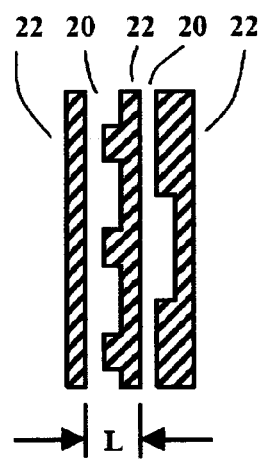
FIG. 2 is an attempt to print Gray codes according to prior art.

In the prior art special Gray code structures such as FIG. 2 have been studied. In that format every Gray code cell, of length L in the down track direction, is forced to have one line 22 and one space 20. Information is encoded by the presence or absence of a reversal in the intermediate interval extending the width of the track. Unfortunately, the recording at the cross track ends of those information bits is poorly controlled and leads to noisy read back signal. That corresponds to the weakened field and corresponding noise found at the edges of conventional write heads, (ibid. van Herk, Tsang). A further difficulty of patterns such as those of FIG. 2 is that channel chips usually are binary based so Gray code cells must contain 2 or 4 subintervals; three subintervals are not usable.

The present invention avoids the problems of Gray codes by using phase encoding methods to provide absolute position information. This information is decoded from signals read at any cross track location. It is not required to accumulate data as the head is moved incrementally from a special reference position such as a crash stop.

Figure 3A:
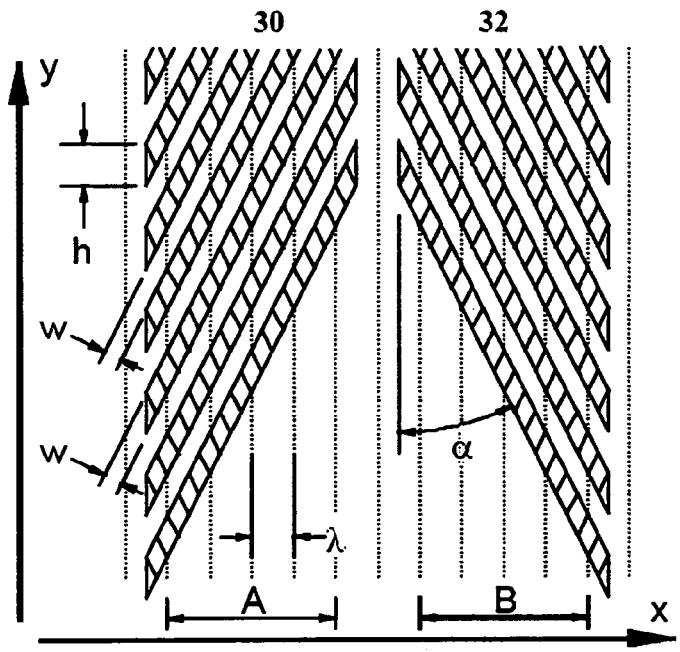
FIG. 3A is a diagram in logical coordinates that defines simple phase encoded position elements of the prior art that are also used in the present invention.

FIG. 3A illustrates geometrical details of the simple phase encoding method of the prior art as in U.S. Pat. No. 3,686,649 to Behr. The pattern is composed of lines and spaces of magnetization of alternating direction. The width, w, of such lines must be larger than the limit of the fabrication method. The forward sloped lines, 30, and the backward sloped lines, 32, are arranged periodically in both x and y directions so that the down track period $\lambda$ is constant in the logical coordinates. Generally the ends of such lines are difficult to print so the signal is sampled or read over a restricted interval such as A for the forward slanted group of lines. That group will be called the A burst in agreement with terms commonly used in servo systems for disk drives.

A group of backward slanted lines is designated as the B burst in FIG. 3A. In general it is convenient, but not necessary, to make the B burst a reflection of the A burst relative to a central vertical timing line as shown here. A particular relation between phases of all bursts at a given value of y can be achieved by physically moving the bursts or by the well known method of adding a burst-specific offset to each measured phase. The preferred method of demodulating the read back signal uses a channel chip with DFT. The resulting sine and cosine components of the Fourier transform are quadrature components for each burst. Simple transformations yield traditional phase angles.

Figure 3B:
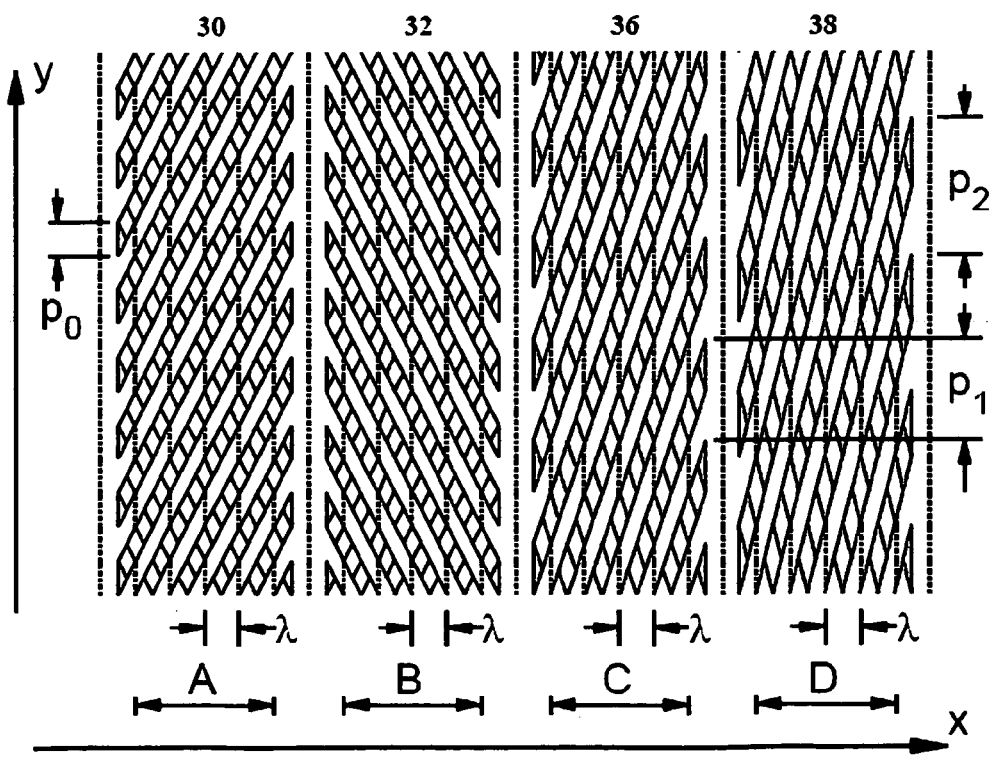
FIG. 3B is an example diagram in logical coordinates of fine position and higher order phase elements of the present invention.

Some truncated lines are omitted in the lower part of FIG. 3A to make the geometry more clear, but generally the elements will fill the entire transverse range of the compound phase pattern of the present invention as suggested in FIG. 3B.

The preferred embodiment uses the DFT of the channel chip to obtain the sine and cosine transforms of each burst such as A, B, C, and D of FIG. 3B. Other bursts may be added to the pattern, and many channel chips accommodate six bursts or more. Other methods can be used to measure timing delays of the various bursts, but the DFT is readily available. Sophisticated channel chips made for tens of millions of disk drives are very cost effective and can also be used for tape systems if they also function at lower frequencies.

Well known methods are used to compute the phase delay of the signals from each burst relative to the sample clock that is aligned, as usual, with timing features of the first part of the servo pattern. For the example illustrated in FIG. 3B the phase angles of the four bursts would be $\Phi_A$, $\Phi_B$, $\Phi_C$, and $\Phi_D$.

It can be seen from FIG. 3A or FIG. 3B that the phase of the A burst will be increased or shifted in the x direction if the read head moves in the y direction. From the antisymmetric geometry it follows that the phase of the B burst decreases by the same magnitude or $\Phi_A = -\Phi_B$. Therefore the sensitivity can be doubled by using the difference, $\Phi_0 = \Phi_A - \Phi_B = 2\Phi_A$, to measure the cross track motion. For the reflected geometry, The SNR (Signal to Noise Ratio) is also increased by about a factor of $\sqrt{2}$ if the noise sources are independently distributed.

The period of the symmetric bursts, A and B, of FIG. 3A is twice the height h of a line in the y direction. However, the phase difference, $\Phi_0 = \Phi_A - \Phi_B$, has a period or pitch, $p_0$, only half as big as shown in FIG. 3B. Generally the phases $\Phi_A$ and $\Phi_B$ are computed to lie in the fundamental interval $0 \leq \Phi < 2\pi$, and their discontinuities are slightly offset. With no loss of generality a simple test and conditional addition of an offset maps $\Phi_0$ to two of the fundamental cycles, each corresponding to motion of $p_0$ in the transverse direction.

Because of various noise sources in every recording system there may be a small error in the sample clock and that would create an error, δ, in each of the phase values. Those errors would cancel in the difference, $\Phi_0=\Phi_A-\Phi_B$, so it also reduces effects of timing jitter. The value of the error can be found from the sum, $\Phi_S=\Phi_A+\Phi_B=2\delta$. This measured error, δ, can be used to correct the measured phase of bursts C, D, etc. that immediately follow the fundamental A, B pair of bursts.

Bursts C, D, etc., can be made with various pitches or periods in the transverse or y direction, but with the same period, λ, in the down track or x direction. The simple illustrative example of FIG. 3B includes a C burst with transverse pitch $p_1=3\ p_0$, where $p_0$ is the pitch of the difference, $\Phi_0=\Phi_A-\Phi_B$. The D burst in this example has pitch $p_2=4\ p_0$. It is convenient to make the sample windows of the A and B bursts equal, but it is generally reasonable to decrease the widths of subsequent bursts used for absolute position determination.

Figure 4A:
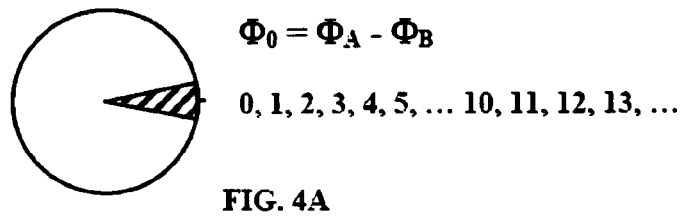
FIG. 4A is a diagram of the phase differences of A and B fine elements of FIG. 3B.
Figure 4B:
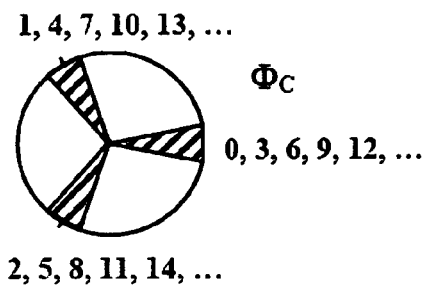
FIG. 4B is a diagram of phase variations of the absolute C burst of FIG. 3B.
Figure 4C:
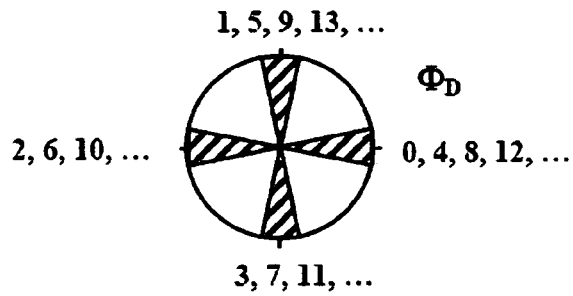
FIG. 4C is a diagram of phase variations of the absolute D burst of FIG. 3B.

Experience has shown that the phase of such bursts can be measured with errors smaller than about one percent of a cycle of 2π radians. Variations of the phases are shown in polar form in FIG. 4 as the head is moved in the y direction over a distance about 13 times the pitch $p_0$ of the fundamental A, B pair. FIG. 4A shows variation of the fundamental difference, $\Phi_0=\Phi_A-\Phi_B$, and the integral cycles are marked with numbers 0, 1, 2, . . . , 12, 13, . . . at angle zero. FIG. 4B plots $\Phi_C$ for the same motion, and numbered markers indicate the phase of the C bursts at the start of each cycle of the fundamental difference. The pitch of the C burst is three times that of the fundamental difference so $\Phi_C$ advances at one third the rate of $\Phi_0$. Similarly FIG. 4C shows $\Phi_D$ which advances at one fourth the rate of $\Phi_0$.

Exaggerated crosshatched sectors in FIG. 4 suggest the errors or uncertainties in each of the three phase measurements at positions corresponding to zero phase of the fundamental $\Phi_0$. It is sufficient that the error regions of the higher order phases, $\Phi_C$ and $\Phi_D$, do not touch. Then it is always possible to uniquely determine the cycle number of the fundamental phase, $\Phi_0$, and hence the absolute position for all fundamental cycles 0 to 11=3*4−1.

As in all such measurements it is possible to determine the phase of each burst or pair of bursts only within one revolution. With no loss of generality the phases can be constrained to the interval $0 \leq \Phi < 2\pi$. A method to select the appropriate cycle of the fundamental phase is explained by FIG. 5 for the same example of FIGS. 3B, 4A, 4B, and 4C. The higher order phases, $\Phi_C$ and $\Phi_D$, are plotted versus the transverse displacement y normalized relative to the fundamental pitch $p_0$. All three phases are equal to zero at the start, but the higher order phases change at their different rates. Challenges occur when the fundamental phase $\Phi_0$ must jump from a value near 0 to a value near 2π. Those jump points are marked by the row of integers, j, corresponding to the number of the cycle beginning at that value of the displacement y.

At those locations the phase $\Phi_C$ also jumps from one to the next of its segments of one-third of the fundamental cycle, and $\Phi_D$ jumps to its next segment of length one-fourth of the fundamental cycle.

As suggested by the crosshatched sectors of FIG. 4, small errors may occur in the measurements, but the ambiguity is resolved by first deciding the value of the fundamental phase $\Phi_0$ with its possible, small error. If $\Phi_0$ is found to be zero or slightly larger, then $\Phi_C$ and $\Phi_D$ are both chosen to be in the segments corresponding to values of y just larger than that at the ideal jump point. Cases where $\Phi_0$ is slightly less than 2π results in segment numbers for C and D phases corresponding to y values just under those at the ideal jump point.

Because the phase angles, $\Phi_D$, are confined to the range $0 \leq \Phi < 2\pi$ it follows that the integers designating the subintervals are also limited and repeat modulo the number of segments. The number of phase segments for a burst is the ratio of its pitch to the fundamental pitch, $p_0$. It is necessary to decode the combinations of segment indices of the C and D bursts in order to find the cycle number of the fundamental A, B difference.

Figure 5:
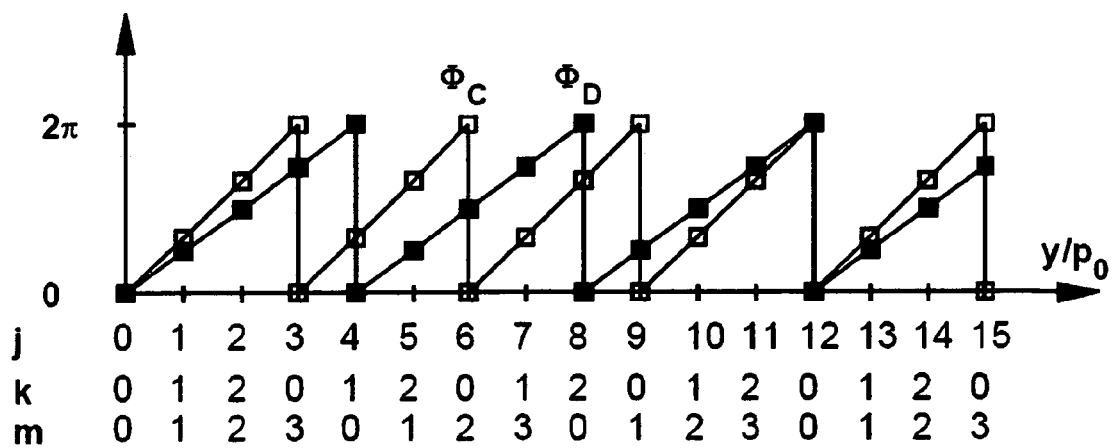
FIG. 5 shows phase variations of the C and D bursts vs the cross track position y.

In FIG. 5 the markers indicate the start of each segment, and the rows of integers under the horizontal axis correspond to the segments of $\Phi_0$, $\Phi_C$, and $\Phi_D$ respectively. The index k for the C burst repeats modulo 3, and index m for the D burst repeats modulo 4. Because the integers 3 and 4 are relatively prime (have no common factors) the combinations of k and m are unique over the first 3×4=12 fundamental cycles. Therefore each of the first 12 k-m pairs identify a unique fundamental cycle numbered j where j is contained in [0, 1, 2 . . . 11]. For larger values of j the k-m pairs would repeat.

The values of k and m are computed from the phase measurements, and then the value of j can be computed for this example from the following algorithm.

| ALGORITHM 1 |
| --- |
| j = M * mod( k − m + K*M, K ) + m |

Here the modulo function mod is the remainder obtained by dividing the first integer argument by the second integer argument in parentheses. Algorithm 1 is valid for any two relatively prime numbers K and M where M>K and mod(M, K)=1. Those conditions are satisfied by any pair of successive integers, that is, with M=K+1, as well as by many other pairs.

The following decoding algorithm is valid if mod(M, K)=2:

| ALGORITHM 2 |
| --- |
| r = mod( m − k + K, K ) |
| if r = 0 |
|     t = 0 |
| else if r is even |
|     t = K − r/2 |
| else |
|     t = ( K − r ) / 2 |
| end |
| j = t * M + m |

Additional bursts can be included in the compound phase pattern to extend the length of the unique combinations of the sub indices provided the number of values for each index has no common factor with any other corresponding number. For example K=3, M=4, N=5 would give unique codes k, m, n for j running from 0 to 3*4*5−1=59.

It can be shown that an odd integer and the next two integers have no common factor, so such a triple can be used to form a unique code sequence of length equal to their product. Then the previously described algorithms can be combined to decode the triplets as follows.

ALGORITHM 3

```
K is odd
M = K + 1
N = M + 1
r = N * mod( m - n + M*2, M ) + n
s = mod( r - k + K, K )
if s = 0
    t = 0
else if s is even
    t = K - s / 2
else
    t = ( K - s ) / 2
end
j = t * M * N + r
```

Some examples of the successive triplets described above are:

| K  | M  | N  | K * M * N |
|----|----|----|-----------|
| 5  | 6  | 7  | 210       |
| 11 | 12 | 13 | 1716      |
| 19 | 20 | 21 | 7980      |
| 51 | 52 | 53 | 140556    |

Many other combinations of relatively prime integers can be found and similar algorithms can be set up to decode the corresponding sets of segment numbers to find the index j of the fundamental cycle. Then the fraction of the fundamental cycle can be added to compute the transverse coordinate as $$y=(j+\Phi_0/(2\pi))*p_0 \qquad (1)$$

PREFERRED EMBODIMENT

The previous methods using relatively prime numbers of sub intervals could be decoded more easily when the numbers of sub intervals were about the same for all higher order bursts. However, errors in measurements of the phase angles are nearly independent of the pitch of the bursts, and that allows use of an encoding method similar to positional number systems such as our conventional decimal notation.

As a simple example let the first higher order burst have a pitch R times the fundamental pitch $p_0$. Then R sub intervals can be accurately identified in each cycle. Let the pitch of the next burst be R*R times $p_0$. For each additional more significant burst let its pitch be R times that of its predecessor. The $2\pi$ phase range of each burst can be accurately divided into R equal phase segments that each identify one cycle of the preceding, less significant burst. If there are Q of such higher order bursts, and if the segment indices, $k_q$, are measured for each burst, with $0 \leq k_q \leq R-1$, then the cross track position, y, can be computed as $$y=[k_{Q-1}*R^{Q-1}k_{Q-2}*R^{Q-2}+\ldots k_1*R+k_0+\Phi_0/(2\pi)]*p_0 \qquad (2)$$

This absolute position can be mapped in various ways to define the physical spacing of tracks in the transverse direction. For example, in hard disk systems some heads may function better than others, and regions near the inner radius of a disk may perform differently from regions near the outer radius. The final, physical mapping or track spacing can be adjusted to optimize robustness and capacity of the drive.

Figure 6:
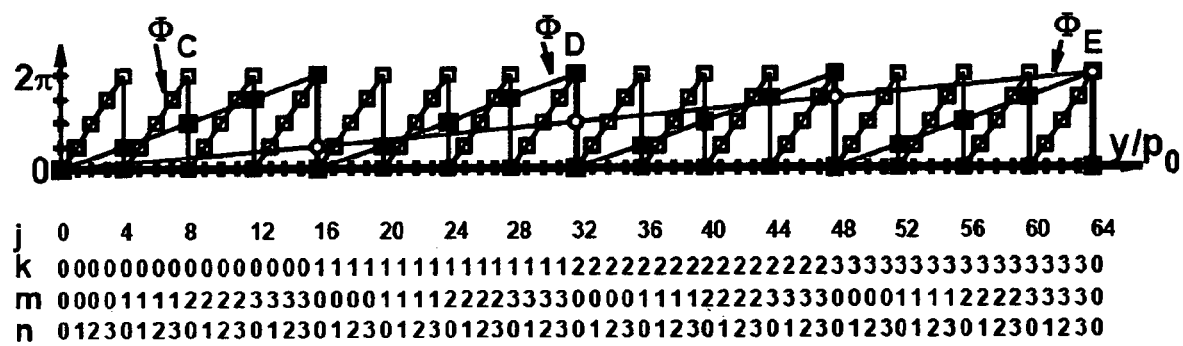
FIG. 6 shows phase variations in an example positional value phase system.

FIG. 6 shows a simple example of such phase variations versus transverse coordinate y. The radix, or ratio R, is 4 in this case. The servo control computations are often done with a binary computational unit or DSP (Digital Signal Processor) operated in integer format. Some calculations such as multiplication and division by R can be done with simpler shift and add operations if R is a power of 2.

In FIG. 6 the segment indices are in the rows designated as k, m, and n, and the index of the fundamental cycle or the integer part of the quantity in square brackets in equation 2 is $$j=k*4^2+m*4+n \qquad (3)$$

Of course, the number of phase segments could be changed for each burst, and then the position values would not be simple powers of a single ratio R, as in equation 2, but would be the product of ratios of all lower order bursts.

In any case the ambiguity caused by the usual system noise at each segment boundary is resolved by working from the phase of the fundamental burst upward through each more significant burst, as explained above. That results in a total error no larger than that of the fundamental burst. The decision making process is similar to that commonly used in reading multi-dial meters having separate dials for units, tens, hundreds, etc.

For track oriented servo systems the on-track position must be maintained with deviations no greater than a small fraction of the nominal track pitch. Therefore narrower tracks require more servo information blocks, and that reduces the area available for user data or other purposes.

Figure 7:
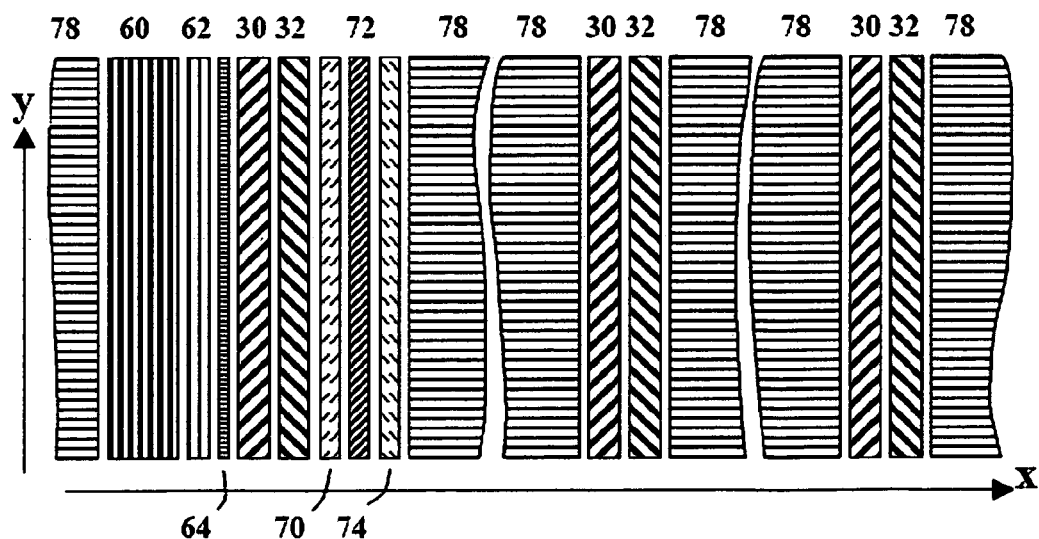
FIG. 7 shows a system with reduced features to improve surface utilization efficiency.

The compound phase system of the present invention offers a means, as suggested in FIG. 7, to ameliorate the space requirements for servo information. Some of the servo blocks comprise more elements such as a synchronization segment 60 for a timing PLL (Phase Locked Loop), a SAM (Servo Address Mark) 62, certain flags 64 for index or other markers, a forward fine burst 30, a backward fine burst 32, and higher order position bursts 70, 72, and 74. Such complete servo blocks can be combined with the user data areas 78 and with abbreviated servo blocks such as those shown comprising only the fine position bursts 30 and 32.

Figure 8:
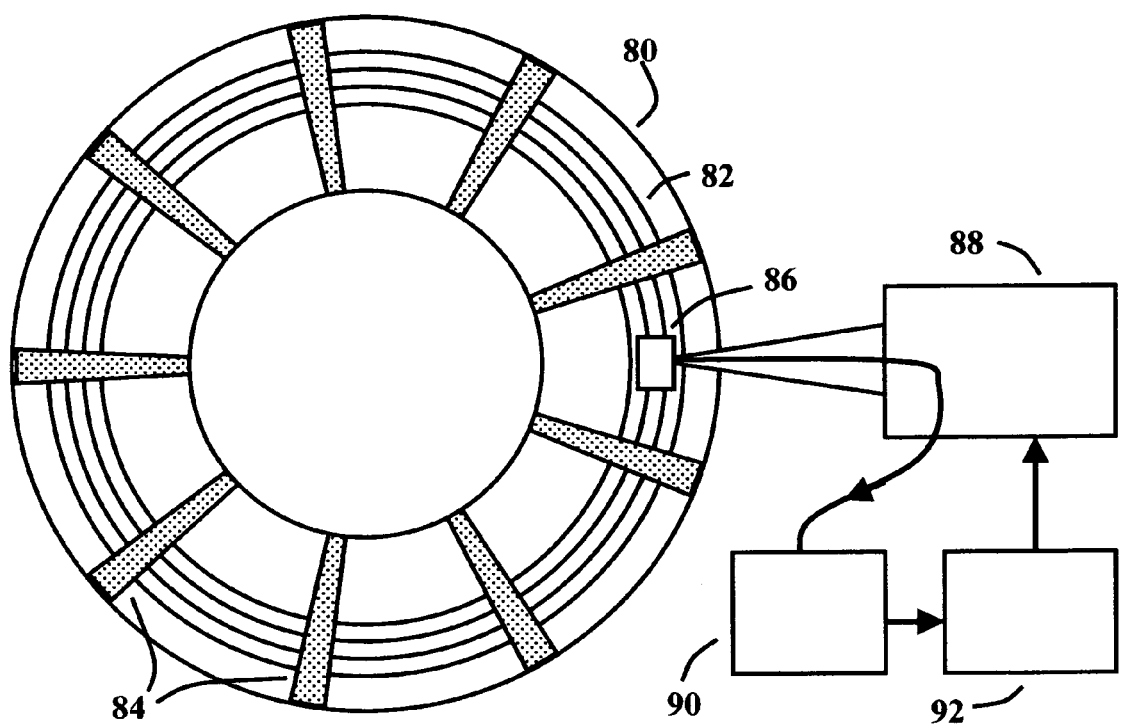
FIG. 8 is a diagram of a machine with a circular reference surface.

A machine with a circular reference surface 80 is shown in FIG. 8. Radial position on the circular tracks 82 is derived from servo blocks 84. Signals from the sensor or transducer 86 are analyzed by the signal unit 90. Further processing by the computation unit 92 provides commands to the servo control 88.

Effective disk drive or tape transport control systems may use timing signals recovered from the servo blocks to regulate the motion of the medium and to synchronize the servo readback clock to the recorded pattern. At start up the information retrieved from the complete servo blocks can be used to initialize the timing systems. When the medium speed is nearly correct then the delay δ of the fundamental bursts of the abbreviated blocks can also be used for final tuning of the timing.

If this compound phase pattern is used for the final servo information of a disk drive and if the disks are printed before assembly into a drive then the pattern may be slightly eccentric relative to the axis of rotation. Well known self-test methods can be used to measure the eccentricity of the pattern, and the final data tracks can either be computed to form concentric tracks or the tracks can follow the eccentricity of the printed servo pattern. In either case predictions of the control system can be verified and corrected at each of the fundamental or fine position chevrons. Adding one or more bursts of higher significance to the reduced servo blocks can enhance the robustness or tolerance of the system to minor disturbances.

During rapid seek motion an advantage of the positional encoding system is that it is only necessary to decode the more significant bursts of the complete servo blocks. As the transverse seek speed decreases it is easier to decode the less significant bursts, and finally in settling and tracking modes the fundamental or finest bursts are decoded and used in the control system.

In addition to the above mentioned examples, various other modifications and alterations may be made without departing from the invention. Accordingly, the above disclosure is not to be considered as limiting and the appended claims are to be interpreted as encompassing the entire spirit and scope of the invention.

What is claimed is:

1. A machine comprising:
    a sensor or transducer;
    a compound phase pattern for use on a reference surface of said machine to compute the cross-track position relative to said pattern, said pattern described in logical coordinates in the time or down-track direction and in the orthogonal or cross-track direction, said pattern comprising a plurality of full servo blocks, and said full servo blocks comprising:
    a. basic elements in the form of slender parallelograms with detectable transitions at the long edges of said parallelograms, and
    b. certain of said basic elements called timing elements with said detectable transitions along isochrones or lines of equal values of said time coordinate, and
    c. one or more special groups of said timing elements to distinguish certain of said servo blocks or to identify a particular location as a timing reference within said servo blocks, and
    d. a plurality of phase bursts or groups of said basic elements at predetermined angles relative to said isochrones and with various predetermined pitches in said cross-track direction and with the same period $\lambda$ in said down-track direction and spanning predetermined numbers of cycles in said down-track direction, with combinations of phases of said phase bursts encoded to define a unique cross-track position,
    whereby both fine and coarse components of said cross-track position are computed from phase information of data obtained from said transducer scanning said compound phase pattern only once in said down-track direction, and
    whereby the small variation of widths of said basic elements mitigates magnetic transfer of said pattern to said reference surface of a magnetic recording device, and
    whereby said compound phase pattern can be used as the final servo pattern for said magnetic recording device.

2. The machine of claim 1 wherein two of said phase bursts, designated burst A having phase $\Phi_A$ and burst B having phase $\Phi_B$ with said $\Phi_A$ and said $\Phi_B$ normalized to the standard interval of values greater or equal zero and less than $2\pi$, comprise said basic elements with the same cross-track pitch and with slopes of the same magnitude but of opposite sign in said logical coordinates, and wherein the fundamental phase difference or $\Phi_0$ is computed from:
    if $\Phi_A \geq \Phi_B$ then $\Phi_0 = \Phi_A - \Phi_B$ else $\Phi_0 = \Phi_A - \Phi_B + 2\pi$,
    whereby said $\Phi_0$ varies with said cross-track coordinate at twice the rate of $\Phi_A$ or $\Phi_B$.

3. The machine of claim 2 wherein said phase bursts other than said burst A or said burst B form an ordered sequence called higher order bursts, and each of said higher order bursts has said cross-track pitch equal to a predetermined burst-specific integer multiplier times said cross-track pitch of said $\Phi_0$, and
    wherein a predetermined burst-specific constant or basic offset is added to the measured phase of each of said higher order bursts and the result is normalized to form its adjusted phase or principal value in said standard interval and with each of said principal values of said higher order bursts having value zero at the same cross-track location as a particular zero of said $\Phi_0$.

4. The machine of claim 3 wherein said burst-specific integer multipliers of said higher order bursts are relatively prime, and said adjusted phase of each of said higher order bursts determines a unique segment index equal to the integer part of the product of said adjusted phase and said burst-specific integer multiplier divided by $2\pi$, and the unique cycle number of said $\Phi_0$ is computed from a predetermined algorithm based on said segment indices obtained for each of said higher order bursts, and said cross-track position coordinate is computed as the sum of said unique cycle number plus the fraction given by said $\Phi_0$ divided by $2\pi$,
    whereby said cross-track position is unique over the number of cycles equal to the product of said relatively prime integers describing said cross-track pitches of said higher order bursts, and
    whereby said cross-track position can be scaled to any convenient range.

5. The machine of claim 3 wherein said cross-track pitch of the first of said ordered sequence of said higher order bursts equals a first integer or burst-specific radix times said cross-track pitch of said $\Phi_0$ and said cross-track pitch of all other of said higher order bursts equals a burst-specific radix times said cross-track pitch of the preceding member of said ordered sequence of said higher order bursts,
    whereby the integer part of the product of said adjusted phase of said higher order burst and said burst-specific radix divided by $2\pi$ forms the segment index for said higher order burst, and
    whereby said segment indices are combined with said radices in a positional number system to identify a unique cycle number of said $\Phi_0$, and
    whereby the cross-track position coordinate is computed as said unique cycle number plus said $\Phi_0$ divided by $2\pi$, and
    whereby said cross-track position can be scaled to any convenient range.

6. The machine of claim 5 wherein said servo pattern further comprises a plurality of short servo blocks that contain only a plurality of said phase bursts,
    whereby the sample windows for said phase bursts of said short servo blocks are determined by time delays measured from a preceding one of said servo blocks, and other values of said phase information are taken from a preceding one of said servo blocks, and
    whereby more of the reference surface is available for other uses.

7. A system for computing the absolute cross-track position of a read-write transducer of a magnetic recording device comprising:
    a. A compound phase pattern on a recording surface of said device defined by basic elements or slender parallelogram shaped regions with magnetization opposite the background state, said basic elements described in logical coordinates in the time or down-track direction and in the perpendicular or cross-track direction comprising:

(i) timing elements or certain of said basic elements with long edges or transitions along isochrones or lines of equal values of said time coordinate, and (ii) an ordered sequence of phase bursts comprising certain of said basic elements with long edges at predetermined angles relative to said timing elements, with the same predetermined pitch in the down-track direction, and with various burst-specific cross-track pitches;

b. a first means to scan said pattern with said read-write transducer during relative motion in said down-track direction;

c. a second means to compute phase information from the signal generated by said transducer as it scans said phase bursts in said down-track direction;

d. a third means to combine said phase information from said phase bursts to compute a unique cross-track position defined over a range determined by said pitches of said phase bursts;

whereby said absolute cross-track position is computed from said phase information of a single scan of local data of said pattern, and whereby the small variation of line widths mitigates magnetic transfer of said pattern to a said recording surface, and whereby contemporary read-write channels can be used to analyze said phase information in said magnetic recording device.

8. The system of claim 7 wherein two of said phase bursts designated burst A and burst B comprise said basic elements with the same cross-track pitch and with slopes of the same magnitude but opposite signs in logical coordinates and said first means and said second means yield corresponding phase values $\Phi_A$ and $\Phi_B$ with said phase values in the standard interval $0 \leq D_0 < 2\pi$, and said third means combines said phase values to form the fundamental phase difference or $\Phi_0$ according to:

if $\Phi_A > \Phi_B$ then $\Phi_0 = \Phi_A - \Phi_B$ else $\Phi_0 = \Phi_A - \Phi_B + 2\pi$, whereby said $\Phi_0$ varies in said cross-track direction at twice the rate of $\Phi_A$.

9. The system of claim 8 wherein said cross-track pitches of said phase bursts other than said A and said B bursts are all integer multiples of half the pitch of said A or said B burst.

10. The system of claim 9 wherein said second means to compute phase information adds a burst-specific constant offset to the measured value of said phase of each of said higher order bursts and then normalizes the result to form its adjusted value in said standard interval so that said adjusted values of all of said higher order adjusted phases have a zero located at a particular zero of said $\Phi_0$.

11. The system of claim 10 wherein ratios of said cross-track pitches of said higher order bursts are all relatively prime integers times the cross-track pitch of said $\Phi_0$, and said third means forms for each of said higher order bursts the product of said relatively prime integer with the ratio of said adjusted phase divided by $2\pi$, and the integer part of said product forms the segment index of said higher order burst, and said third means computes the unique cycle number of said $\Phi_0$ from a predetermined algorithm based on said segment indices, and said cross-track position coordinate is computed as the sum of said cycle number plus the fraction of a cycle given by said $\Phi_0$ divided by $2\pi$, whereby said cross-track position coordinate can be scaled to any convenient range.

12. The system of claim 10 wherein the ratio of said cross-track pitch of the first of said ordered sequence of higher order bursts is an integral multiple or first burst-specific radix times said cross-track pitch of $\Phi_0$, and said cross-track pitch of successive members of said ordered sequence of higher order bursts is a burst-specific radix times said cross-track pitch of the preceding of said higher order bursts, and said third means forms the product of said burst-specific radix with the ratio of said adjusted phase over $2\pi$, and the integer part of said product forms the segment index of said higher order burst, and said third means computes the unique cycle number of said $\Phi_0$ as a positional number based upon said segment indices and said radices, and said cross-track position coordinate is computed as the sum of said cycle number plus the fraction given by said $\Phi_0$ divided by $2\pi$, whereby said cross-track position coordinate can be scaled to any convenient range.

13. A method of computing a cross-track position coordinate for a system comprising steps:

a. providing a compound phase pattern defined in logical down-track and cross-track coordinates on a scannable surface of said system, said pattern comprising extended servo blocks comprising strips or regions in the form of slender parallelograms with detectable edges wherein:

(i) certain collections of said strips called timing elements have said detectable edges at constant values of said down-track coordinate and certain of said timing elements provide a timing reference and other groups of said timing elements identify said extended servo blocks or identify a certain position within said extended servo blocks, and (ii) a plurality of phase bursts each comprising phase elements or certain of said strips spaced with the same period $\lambda$ in said down-track direction and with said phase elements of each of said phase bursts at the same predetermined angle relative to said timing elements, said predetermined angle being unique for each of said phase bursts;

b. providing transducer means to scan said compound phase pattern at essentially constant relative speed in said down-track direction to produce a read signal from said detectable edges;

c. providing signal processing means to measure the raw phases of portions of said read signal from each of said phase bursts and to select the principal value in the standard interval starting at 0 and including all positive values less than $2\pi$;

d. providing computation means to combine said phases and determine said cross-track position;

e. executing a self-test procedure to measure actual characteristics including minor alignment errors and eccentricity of said compound phase pattern;

f. recording results of said self-test procedure in a memory component of said system for use in later operation;

g. operating said system with steps comprising:

(i) retrieving said results of said self-test procedure from said memory component (ii) scanning said compound phase pattern with said transducer means to produce said read signal (iii) using said signal processing means to measure said phases of said phase bursts (iv) applying said computation means to combine said phases and said results of said calibration procedure to determine said cross-track position.

14. The method of claim 13 wherein
a. two of said phase bursts, designated burst A and burst B, have said phase elements with slopes of the same magnitude but of opposite sign in said logical coordinates, and
b. all other of said phase bursts form an ordered sequence of higher order bursts wherein the first higher order burst of said ordered sequence has said cross-track period that is an integer multiple or first radix times half of said cross-track period of burst A or burst B and wherein said cross-track period of other members of said ordered sequence of higher order bursts is equal to a burst-specific radix times the cross-track period of the preceding member of said ordered sequence of higher order bursts.

15. The method of claim 14 wherein during said operating step:
a. the raw phase of each of said phase bursts is measured, and
b. said results of said self-test procedure are used
  (i) to add a standard offset to said raw phase of said B burst so that, on average, $\Phi_B = \Phi_A$ at values of said cross-track coordinate where $\Phi_A = \pi/2$, and
  (ii) to add a burst-specific offset to said raw phases of all said higher order phase bursts so the resulting phases have, on average, a zero at a particular cross-track location where $\Phi_B = \Phi_A$, and
  (iii) to compute the fundamental phase difference or $\Phi_0$ as
   if $\Phi_A \geq \Phi_B$ then $\Phi_0 = \Phi_A - \Phi_B$ else $\Phi_0 = \Phi_A - \Phi_B + 2\pi$;
c. the resulting phase value of the first of said ordered sequence of higher order phase bursts is adjusted by adding $(\pi - \Phi_0)/$(said first radix), and by adjusting said resulting phase of other members of said ordered sequence of higher order bursts by adding ($\pi$–said adjusted phase of the preceding higher order burst)/(said burst-specific radix) to urge said resulting phase value to the middle of the appropriate phase segment, and normalizing said adjusted phase to the principal value in said standard interval, and
d. forming the result of multiplying said normalized phase value by said burst-specific radix and dividing by $2\pi$ then selecting the integer part of said result as the segment index for said phase burst, and
e. combining said segment indices and said first radix and said burst-specific radices in a positional number system to provide the unique cycle index of said $\Phi_0$ as the integer part and adding the fraction of said $\Phi_0$ divided by $2\pi$ to form said cross-track position coordinate.

16. The method of claim 15 wherein small values of clock error $\tau$ are computed from:

$$\delta = (\Phi_A + \Phi_B)/2$$

if $\delta \geq \pi$ then $\tau = \delta - 3\pi/2$ else $\tau = \delta - \pi/2$,
and said clock error $\tau$ is subtracted from said resulting phase value of step (15. b.) before normalizing.

17. The method of claim 15 wherein said predetermined angle of said phase elements of one of said higher order bursts is zero, and said clock error $\tau$ is computed as the variation of said phase from its average value, and said clock error $\tau$ is subtracted from said resulting phase of step (15. b.) before normalizing.

18. The method of claim 15 wherein said pattern further comprises short servo blocks, said short servo blocks containing only certain of said position phase bursts, and wherein sampling windows for reading said signal from said phase bursts of said short servo blocks are determined by timing delays measured from a previous servo block,
whereby additional area of said scannable surface of said system is made available for other uses.

* * * * *